Sept. 25, 1962 F. SALTZ ET AL 3,055,581

CAPACITOR COMPARING DEVICE

Filed Oct. 24, 1956

2 Sheets-Sheet 1

INVENTORS
FRED SALTZ
JAMES P. HAMMER
BY
Campbell, Brumbaugh, Free & Graves
THEIR ATTORNEYS INVENTORS
FRED SALTZ
JAMES P. HAMMER
BY
Campbell, Brumbaugh, Free & Graves
THEIR ATTORNEYS 3,055,581
CAPACITOR COMPARING DEVICE
Fred Saltz and James P. Hammer, Binghamton, N.Y., assignors to International Business Machines Corporation, New York, N.Y., a corporation of New York
Filed Oct. 24, 1956, Ser. No. 618,135
7 Claims. (Cl. 235—61.7)

This invention relates to comparing methods and devices, and more particularly to a new and improved capacitor comparing method and device for comparing two sets of numerically coded data.

In the field of data processing, the art of recording and reading coded information on punch cards and the like is generally well known. As one of the steps in the processing of information so recorded, it is frequently necessary to compare the data contained on two cards, index-point by index-point, and the present invention provides a new and improved method and means for accomplishing this.

According to the invention, there are provided two series of storage units such as capacitors corresponding to the series of index-points on each of the cards to be compared. The capacitors in each series are connected in sequence to a conventional readin device associated with the corresponding data card. The operation of the readin devices is synchronized with the comparing device so that related index-points on the two cards are scanned simultaneously and an information signal, such as a positive voltage, is applied to the corresponding capacitors in each series according to the information recorded on the cards. The capacitors are then connected in a series circuit so that equal charges are cancelled and a charge on one capacitor only is divided between the two with opposed polarities. Each capacitor is then connected to a suitable readout device for detecting the presence and polarity of the remaining charge. In this manner a control device, for example, may be actuated by differences in the information recorded on the cards.

More particularly, the invention contemplates the use of three pairs of distrbutor contacts associated with each capacitor, the elements of each pair of contacts being connected to opposite sides of the capacitor, and three pairs of brushes associated with each series of capacitors adapted to sweep over the pairs of contacts in sequence. The first and last pairs of brushes are arranged to connect the capacitors to readin and readout devices, respectively, and the second pairs are adapted to place the two capacitors in a series circuit in the manner described above.

The advantages and utility of the novel capacitor comparing method and device of this invention will become more apparent from the following description of one embodiment taken with accompanying drawings, in which.

Figure 1:
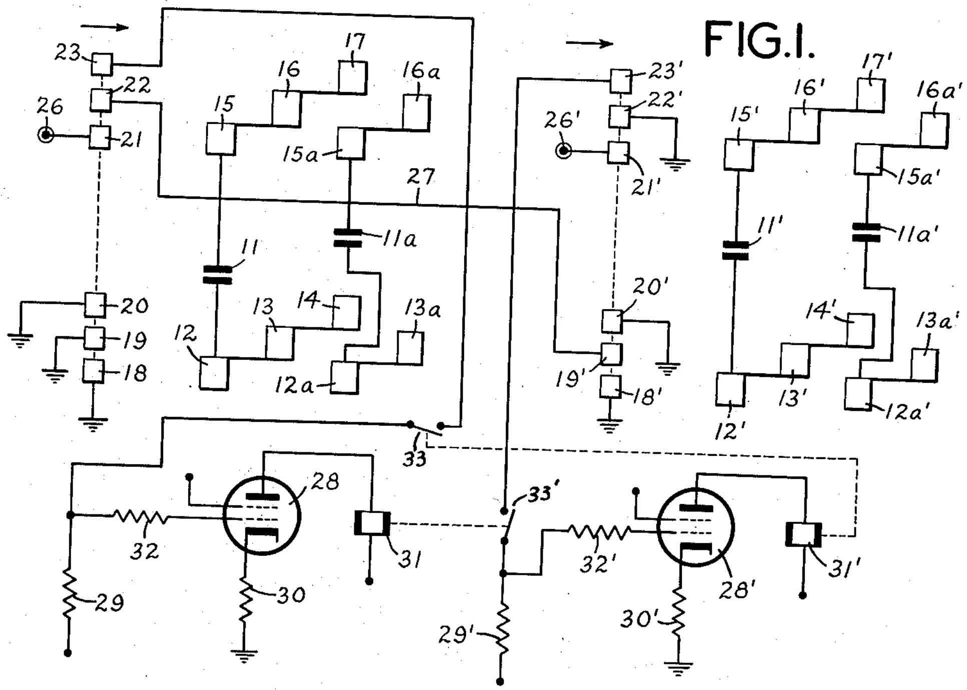
FIG. 1 is a diagrammatic illustration showing a representative portion of the circuit utilized by the invention.
Figure 3:
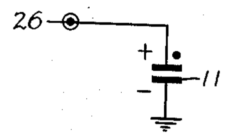
FIGS. 3–6 illustrate diagrammatically the sequence of capacitor connections and the disposition of the charges when both capacitors are charged.

The two cards and the similar circuit elements associated with each will be referred to as primary or secondary cards or elements in the following description, and elements of the secondary circuit corresponding to those of the primary circuit are indicated by primed reference numerals in the drawings.

Referring first to FIG. 1, two capacitors 11 and 11*a* are illustrated and these represent the first two of a series of like capacitors associated with the primary card. A similar series of capacitors associated with the secondary card is represented by the two capacitors 11' and 11*a'*. Three distributor contacts 12, 13 and 14, positioned in staggered relation, are electrically connected to one plate of the capacitor 11 and three more contacts 15, 16 and 17 are similarly connected to the opposite plate. These contacts are positioned to form three spaced pairs of contacts 12 and 15, 13 and 16, and 14 and 17, so that the pairs will be connected in succession by a straight line sweeping across them. Similarly arranged distributor contacts are associated with each subsequent capacitor of the series.

In order to provide electrical connection to the capacitors, six brushes 18, 19, 20, 21, 22 and 23 are arranged in a line and each is positioned to engage only one of the distributor contacts associated with each capacitor as the line of brushes is moved across the distributor contacts.

The apparatus thus far described is the same in both the primary and secondary circuits, similar elements in the secondary circuit being indicated by primed reference numerals in FIG. 1.

Figure 2:
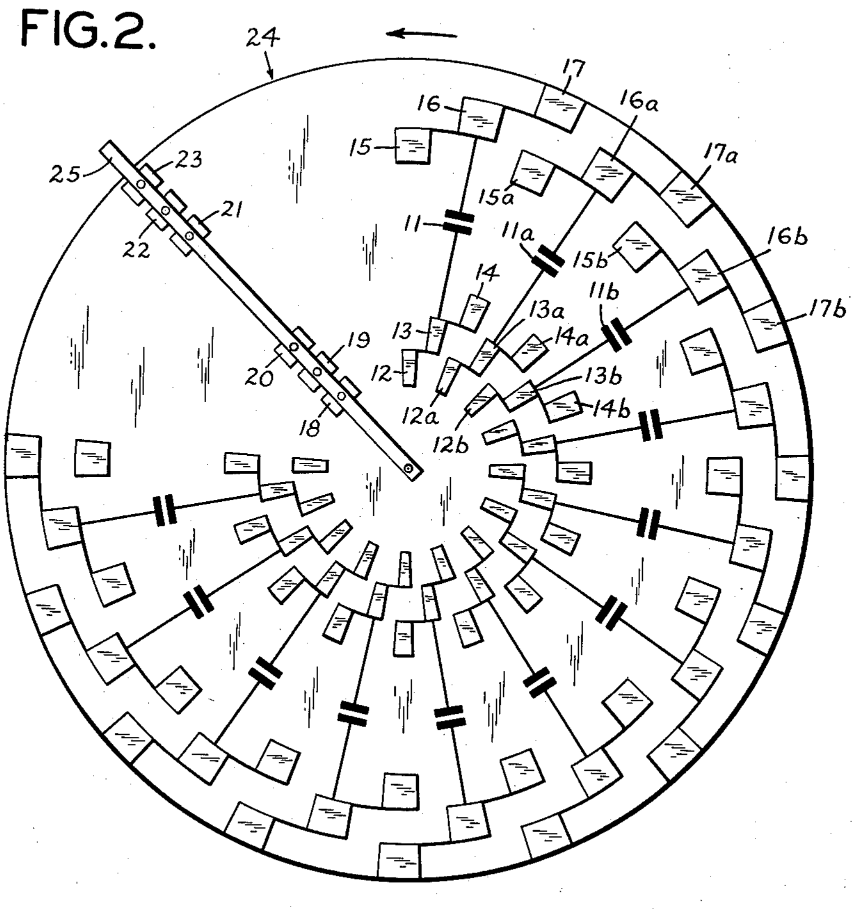
FIG. 2 is a plan view showing the construction of a typical capacitor comparing device arranged according to the invention.

In FIG. 2 the construction of a typical embodiment of this apparatus is illustrated. This comprises a rotatably mounted disk 24 on which the series of capacitors 11, 11*a* and their associated distributor contacts are angularly disposed, preferably in the form of a printed circuit. In this arrangement the corresponding distributor contacts for each capacitor are positioned in annular paths and the brushes 18, 19, 20, 21, 22 and 23 are positioned on a radial arm 25 to engage the contacts in sequence as the disk is rotated with respect to the arm. This arrangement provides the required apparatus in compact and inexpensive form and is adapted for continuous operation of the comparing device without unnecessary delay between comparing cycles.

As illustrated in FIG. 1, the brushes 18, 19 and 20 and 18', 20' and 22' are grounded and the brushes 21 and 21' are connected to two terminals 26 and 26', respectively.

Conventional readin devices (not shown) associated with the primary and secondary cards are connected to the terminals 26 and 26'. These may be of the type, for example, which supply a positive voltage signal when an information bit is encountered on the data card and no signal if no bit is present. The operation of the readin devices is synchronized with that of the comparing device. The corresponding index-points on the two cards are simultaneously read and the associated capacitor in each series is connected to the readin device at the same time.

The brushes 22 and 19' are electrically connected by a conductor 27 and the brushes 23 and 23' are connected to primary and secondary readout devices for detecting the presence and polarity of a charge on the capacitors, for example, the amplifiers 28 and 28'.

Each of the amplifiers 28 and 28' may be suitably biased through resistors 29, 30, 29' and 30' so that a positive charge on the plate of a capacitor connected to it will energize a control device such as a relay 31 or 31' connected in the plate circuit. These relays may be utilized, for example, to actuate mechanical equipment (not shown) to select the card on which the numerical value of the recorded information is higher at a given index-point.

Two normally closed switches 33 and 33' placed in series with the brushes 23 and 23', respectively, are adapted to be opened by energization of the relays 31' and 31, respectively. The relays are of a type which remain energized after actuation until reset and are linked to the switches so that the switches remain open until the relays are reset.

Two grid resistors 32 and 32' are interposed between the amplifiers and the brushes 23 and 23', respectively. The values of these and of the resistors 29, 30, 29' and 30' are selected so that any charge on the capacitors will be substantially dissipated during the time of contact of the brushes 20, 23, 20' and 23' with the distributor contacts 14, 17, 14' and 17'.

Figure 4:
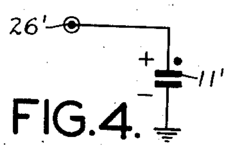
Figure 8:
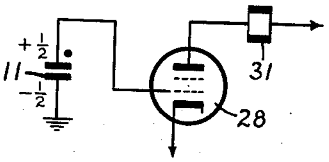
Figure 9:
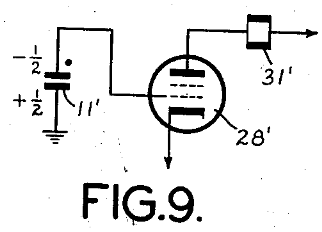

In operation, the primary row of brushes is moved over the distributor contacts in the direction of the arrow shown in FIG. 1, and each capacitor is first connected between the primary readin device and ground by the brushes 18 and 21. The circuit thus completed is illustrated diagrammatically in FIG. 3. If an information bit is present at the corresponding index-point on the data card, the positive voltage supplied by the readin device will induce a charge on the capacitor 11 in the manner shown in FIG. 3. The corresponding secondary capacitor will be simultaneously charged in the same manner if an information bit is present at the same index-point on the secondary card, as shown in FIG. 4. In FIGS. 3–9 the dot adjacent each capacitor indicates the plate of the capacitor which was connected to the readin device in this step of the method.

Figure 5:
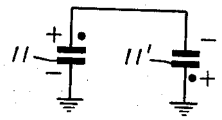

The brushes 19, 22, 19' and 22' then engage the second pairs of contacts to connect the capacitors in a series circuit arrangement such that identical charges on both capacitors are cancelled and a charge on one capacitor only is divided between the two, to complete the circuit shown in FIG. 5. If both capacitors have been charged by the readin devices, as in the case illustrated in FIG. 5, the charges, being opposed and equal, will be completely cancelled.

Figure 6:
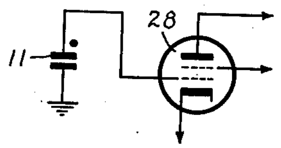

Finally, the brushes 20, 23, 20' and 23' connect the primary and secondary capacitors to the amplifiers 28 and 28' in the manner shown in FIG. 6. In the assumed case, the charges having cancelled, no voltage signal is received by either amplifier.

As illustrated in FIGS. 1 and 2, the distributor contacts 14, 17, 12*a* and 15*a* may be arranged so that the readout step for one capacitor and the readin step for the next capacitor in the series occur simultaneously.

Figure 7:
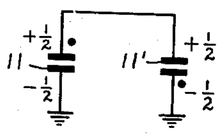
FIGS. 7–9 illustrate diagrammatically the sequence of capacitor connections and the disposition of the charges when only one capacitor is charged.

If only one of the data cards contains an information bit at a particular index point, only one of the corresponding capacitors is charged on readin and this charge is equally divided between the two capacitors in the comparing step in the manner illustrated in FIG. 7. It will be noted that the capacitor charged in the readin step retains a positive charge on the input plate (indicated by the dot) and a negative charge is induced on that plate in the other capacitor. In this case, it is assumed that the primary capacitor 11 has been charged and the secondary capacitor 11' has not been. Under these conditions when the capacitors 11 and 11' are connected to the amplifiers 28 and 28' in the manner shown in FIGS. 8 and 9, the relay 31 is energized, the amplifier 28 being connected to the positive plate of the capacitor 11, but the relay 31' is not energized, the amplifier 28' being connected to the negative plate of the capacitor 11'.

When the relay 31 is energized the switch 33' to which it is linked is opened so that the formation of a circuit to the relay 31' is prevented until the relay 31 is reset at the end of the comparing cycle. Thus, only the first difference between the data recorded on the two cards affects the relays 33, 33' and differences at subsequent index-points in the same comparing cycle are not detected.

Figure 10:
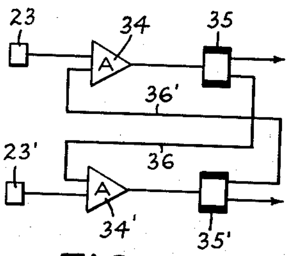
FIG. 10 illustrates a typical circuit adapted to readout and compare the charges on the capacitors.

The circuit illustrated in FIG. 10 illustrates another arrangement for obtaining the same result. In this embodiment, the brushes 23 and 23' are connected to suitable amplifiers 34 and 34' which are adapted to actuate latches or relays 35 and 35', respectively. In addition to operating control apparatus, the latches 35 and 35' are adapted to supply a blocking signal, such as a negative bias potential, after actuation. This signal is applied through conductors 36 and 36' from each of the latches to the amplifier associated with the other latch to prevent actuation by a subsequent information difference signal. The latches may be reset at the end of a comparing cycle by a conventional reset device (not shown).

The invention thus provides a new and effective method and means for comparing numerically coded data utilizing a novel device of simple and compact construction and requiring a minimum of components.

The specific embodiment herein described is intended to be merely illustrative and not restrictive of the invention. Various modifications and changes will be apparent to those skilled in the art which are within the scope of the following claims.

We claim:

1. In a device for comparing numerically coded data including charging means, charge combining means, and charge sensing means, data storage means comprising capacitor means electrically connected to a plurality of pairs of contact means, the elements of each of said pairs being connected to opposite sides of said capacitor means, connecting means comprising a plurality of pairs of brush means arranged to contact said pairs of contact means in sequence upon relative motion between said brush means and said contact means so that said capacitor means is successively connected to the charging means, the charge combining means and the charge-sensing means.

2. In a device for comparing numerically coded data including charging means, charge combining means, and charge-sensing means, data storage means comprising a plurality of capacitors angularly displaced about a disk, distributor means comprising three pairs of contact means associated with each of said capacitors, the elements of each of said pairs being connected to opposite plates of the associated capacitor, connecting means comprising three pairs of brushes arranged to contact said three pairs of contact means in sequence upon rotation of said disk so that each of said plurality of capacitors is successively connected to the charging means, the charge combining means and the charge-sensing means.

3. In a device for comparing numerically coded data including charging means, charge combining means, and charge-sensing means, a rotatably mounted disk printed with an electrical circuit comprising a plurality of capacitors angularly disposed about said disk, three pairs of distributor contacts associated with each of said capacitors, the contacts of each of said pairs being connected to opposite plates of the associated capacitor, said contacts being positioned at different radii on said disk to come into contact with radially spaced brushes upon relative rotation between said brushes and said disk so that said capacitor is successively connected to the charging means, the charge combining means and the charge sensing means.

4. In a device for comparing two sets of numerically coded data index-point by index-point including charging means and charge-sensing means, two capacitors associated with corresponding index-points in said two sets, three pairs of distributor contacts associated with each of said capacitors, the elements of each of said pairs being connected to opposite plates of the capacitor, and three pairs of brush means associated with each of said sets of data adapted to operate in sequence to connect each of said capacitors to the charging means, connect the two capacitors in a series circuit, and connect each capacitor to the charge-sensing means.

5. In a device for comparing two sets of numerically coded data including charging means and charge-sensing means, data storage means associated with each of said sets comprising a plurality of capacitor means, contact means arranged in pairs associated with each of said capacitor means, the elements of each of said pairs being connected to opposite sides of said capacitor means, connecting means associated with each of said pluralities of capacitor means comprising a plurality of pairs of brush means adapted to contact said pairs of contact elements associated with each of said capacitor means in sequence upon relative motion between said contact means and said connecting means to successively connect said capacitor means to the charging means, to the corresponding capacitor means associated with the other of said two data sets in a series circuit and to the charge-sensing means.

6. In a device for comparing two sets of numerically coded data, index-point by index-point including charging means and charge-sensing means, a plurality of capacitors associated with each of said data sets, the corresponding capacitors in each of said pluralities being associated with corresponding index-points in said data sets, distributor means associated with each of said capacitors comprising three pairs of contacts, the elements of each of said pairs being connected to opposite plates of the capacitor, connecting means associated with each of said pluralities of capacitors comprising three pairs of brushes adapted to contact said pairs of contacts in sequence upon relative motion between said connecting means and said distributor means to successively connect each of said capacitors to the charging means, to the capacitor associated with the corresponding index-point in the other of said two sets of data in a series circuit so that charges on both capacitors are cancelled and a charge on one capacitor only is apportioned between the two and to the charge sensing means.

7. In a device for comparing two sets of coded information, storage means comprising a pair of normally unconnected signal storage units for receiving corresponding information signals separately from the two sets, means for connecting the storage units, a series circuit to cancel like information signals stored therein, and detecting means arranged to be connected to the storage units and responsive to information signals remaining therein.

References Cited in the file of this patent

UNITED STATES PATENTS

| | | |
|---|---|---|
| 2,349,437 | Keeler | May 23, 1944 |
| 2,514,054 | Hallden | July 4, 1950 |
| 2,660,372 | Leclerc | Nov. 24, 1953 |